United States Patent
Huang et al.

(10) Patent No.: US 9,581,080 B2
(45) Date of Patent: Feb. 28, 2017

(54) RATE-BASED MODEL PREDICTIVE CONTROL METHOD FOR INTERNAL COMBUSTION ENGINE AIR PATH CONTROL

(71) Applicants: Toyota Motor Engineering & Manufacturing North America, Inc., Erlanger, KY (US); The Regents of the University of Michigan, Ann Arbor, MI (US)

(72) Inventors: Mike Huang, Ann Arbor, MI (US); Ilya V Kolmanovsky, Novi, MI (US)

(73) Assignees: Toyota Motor Engineering & Manufacturing North America, Inc., Erlanger, KY (US); The Regents of the University of Michigan, Ann Arbor, MI (US)

(*) Notice: Subject to any disclaimer, the term of this patent is extended or adjusted under 35 U.S.C. 154(b) by 1057 days.

(21) Appl. No.: 13/724,957

(22) Filed: Dec. 21, 2012

(65) Prior Publication Data
US 2014/0174413 A1    Jun. 26, 2014

(51) Int. Cl.
| F02B 47/00 | (2006.01) |
| F02B 47/08 | (2006.01) |
| F02D 41/00 | (2006.01) |
| F02D 41/14 | (2006.01) |

(52) U.S. Cl.
CPC .......... *F02B 47/08* (2013.01); *F02D 41/0077* (2013.01); *F02D 41/1401* (2013.01); *F02D 41/0007* (2013.01); *F02D 2041/1412* (2013.01); *F02D 2041/1434* (2013.01); *Y02T 10/47* (2013.01)

(58) Field of Classification Search
CPC .. F02B 47/08; F02D 41/1401; F02D 41/0077; F02D 41/0007; F02D 2041/1434; F02D 2041/1412; Y02T 10/47
See application file for complete search history.

(56) References Cited

U.S. PATENT DOCUMENTS

| 5,527,238 A | 6/1996 | Hrovat et al. |
| 5,771,482 A | 6/1998 | Rizzoni |
| 6,990,401 B2 | 1/2006 | Neiss et al. |
| 7,016,779 B2* | 3/2006 | Bowyer .............. F02D 41/0007 701/108 |
| 7,076,953 B2* | 7/2006 | Kreso ..................... F02B 37/24 123/568.11 |

(Continued)

OTHER PUBLICATIONS

Hermans et al., "Low-complexity Model Predictive Control of Electromagnetic Actuators with a Stability Guarantee", undated in 6 pages.

(Continued)

*Primary Examiner* — Hieu T Vo
*Assistant Examiner* — Sherman Manley
(74) *Attorney, Agent, or Firm* — Christopher G. Darrow; Darrow Mustafa PC

(57) ABSTRACT

A rate based model predictive controller for air path control for a diesel engine regulates turbine lift and EGR valve flow rate to specified set points by coordinated control of intake manifold air pressure and EGR valve flow rate. The controller utilizes a rate-based reduced order linear model for model predictive control.

16 Claims, 8 Drawing Sheets

(56) References Cited

U.S. PATENT DOCUMENTS

| | | | | |
|---|---|---|---|---|
| 7,275,374 | B2* | 10/2007 | Stewart | F02D 23/00 |
| | | | | 123/299 |
| 7,328,577 | B2* | 2/2008 | Stewart | F02D 23/02 |
| | | | | 60/285 |
| 7,415,389 | B2 | 8/2008 | Stewart et al. | |
| 7,877,195 | B2 | 1/2011 | Angeby | |
| 8,090,456 | B2 | 1/2012 | Karpman et al. | |
| 8,229,872 | B2 | 7/2012 | Gilhuly | |
| 8,295,951 | B2 | 10/2012 | Crisalle et al. | |
| 2011/0264353 | A1* | 10/2011 | Atkinson | F02D 41/1402 |
| | | | | 701/102 |
| 2014/0316683 | A1* | 10/2014 | Whitney | F02D 11/105 |
| | | | | 701/108 |

OTHER PUBLICATIONS

Betti et al., "An MPC algorithm for offset-free tracking of constant reference signals", 51st IEEE Conference on Decision and Control, Dec. 10-13, 2012. Maui, Hawaii, USA, pp. 5182-5187.

Wang, Liuping, "A Tutorial on Model Predictive Control: Using a Linear Velocity-Form Model", Dev. Chem. Eng. Mineral Process. 12(5/6), 2004, pp. 573-614.

Grancharova, Alexandra and Johansen Tor Ame, Explicit Nonlinear Model Predictive Control—Theory and Applications, Lecture Notes in Control and Information Sciences, vol. 429.

Ferreau, H. J., H. G. Bock and M. Diehl (2008). An online active set strategy to overcome the limitations of explicit MPC. International Journal of Robust and Nonlinear Control, 18, 816-830.

A. Bemporad F. Borelli and M. Morari .Model predictive control based on linear programming—the explicit solution . . . IEEE Transactions on Automatic Control, 47, pp. 1974.1985, 2002.

A. Bemporad, M. Morari, V. Dua, and E. N. Pistikopoulos, "The explicit linear quadratic regulator for constrained systems," Automatica, vol. 38, pp. 3-20, 2002.

Peter Ortner and Luigi Del Re, Predictive Control of a Diesel Engine Air Path, IEEE Transactions on Control Systems Technology, vol. 15, No. 3, May 2007.

S. Di Cairano, D. Yanakiev, A. Bemporad, I.V. Kolmanovsky, D. Hrovat, An MPC design flow for automotive control and applications to idle speed regulation, Proceedings of the 47th IEEE Conference on Decision and Control, Cancun, Mexico, Dec. 9-11, 2008.

A. Bemporad, "Model-based predictive control design: New trends and tools," In Proc. 45th IEEE Conf. on Decision and Control, San Diego, CA, 2006, pp. 6678-6683.

A. Bemporad, Hybrid Toolbox—User's Guide, Dec. 2003, http://www.dii.unisi.it/hybrid/toolbox.

M. Kvasnica, P. Grieder, M. Baotic, Multi-Parametric Toolbox (MPT), 2004, Available: http://control.ee.ethz.ch/mpt.

J. DeCastro, Rate-Based Model Predictive Control of Turbofan Engine Clearance, Journal of Propulsion and Power, vol. 23, No. 4, Jul.-Aug. 2007.

Jung et al., Control-Oriented Linear Parameter-Varying Modelling of a Turbocharged Diesel Engine, CCA 2003. Proceedings of 2003: ieexplore. Retrieved from the Internet at: http://citeseerx.ist.psu.edu/viewdoc/download?doi=10.1.1.228.6126&rep=rep1&type=pdf.

Wahlstrom et al., EGR-VGT Control and Tuning for Pumping Work Minimization and Emission Control, IEEE Transactions on Control Systems Technology, vol. 18, No. 4. Retrieved from the Internet at: http://umu.diva-portal.org/smash/get/diva2:218335/FULLTEXT01.

\* cited by examiner

Overshoot Constraint Enforcement with RB-MPC for Various Values of $O_{overshoot}$ 50 Step Predicted Trajectories Starting at Times 26, 26.5, and 27s Trajectories with RB-MPC and Overshoot Constraint of 0kPa Enforced 20 Steps Ahead

RATE-BASED MODEL PREDICTIVE CONTROL METHOD FOR INTERNAL COMBUSTION ENGINE AIR PATH CONTROL

BACKGROUND

The present description relates, in general, to methods and controls for internal combustion engines and, more particularly, to methods for controlling diesel engines.

Modern diesel engines uses variable geometry turbines (VGT) to increase the amount of air supplied to the engine cylinders. The VGT varies the angle of the turbine stator inlet vanes to change the amount of air supplied to the engine cylinders.

In addition to providing optimum performance and fuel economy, modern diesel engines must also meet stringent federal regulations on emissions, particularly, particulate matter and nitrogen oxides. In order to meet all of these requirements, diesel engines with a VGT also use an exhaust gas recirculation (EGR) valve that has a variable controlled position to recirculate varying amounts of engine exhaust gases back into the engine cylinders for more complete combustion and reduced engine emissions.

As the engine operates over a large range of operating conditions, including engine speed, fuel usage, engine load, etc., one and typically multiple controllers are embedded in the engine control unit (ECU) to control various engine actuators in response to sensors detecting engine performance in order to optimize engine performance, emissions, etc,.

The use of Model Predictive Control (MPC) is growing for engine control. A standard MPC approach incorporates integral type action to guarantee zero state-to-state error that adds additional integral states to the predictive control model. The MPC model uses a number of different engine operating ranges (fuel rate and engine speed), and develops a controller for each range to control the engine actuators.

In a specific example of model predictive control applied to diesel engine airflow, the flows in the engine are controlled using the variable geometry turbine (VGT), EGR throttle, and an EGR valve actuator. These systems are strongly coupled and are highly, non-linear.

However, prior applications of model predictive controllers to internal combustion engines and, in particular to diesel engines have utilized multiple operating ranges of engine performance, each of which has required a separate predictive controller. Further, each predictive controller uses integral type action that presents problems with overshoot restraints of controlled engine variables.

It would be desirable to provide model predictive controller for use with an internal combustion engine, which has a minimal number of operating ranges for reduced computation time, and memory storage requirements, while at the same time providing zero state-to-state tracking error of engine controlled performance variables.

SUMMARY

A method for controlling an internal combustion engine having a controller controlling a variable geometry turbine (VGT) and an EGR valve during engine operation includes using a rate based predictive model in the controller responsive to engine intake manifold pressure and EGR valve flow to generate requested EGR flow rate and engine turbine lift.

The method further includes defining at least one engine operating zone about a center linearization point for engine speed range and fuel rate ranges.

The method further includes developing a non-linear model of the engine operating parameters.

The method further includes developing a linear quadratic model predictive controller in each zone.

The method further includes linearizing the non-linear model at a center operating point within each operating zone.

The method further includes developing a second order reduced linear model based on the non-linear model.

The method further includes generating the rate-based predictive model as a derivative of the linear model.

The method further includes generating the linear model as a linear quadratic model in the form of a piecewise affine control law wherein:

$$u_{k+1}=u_k+T_s(F_i x_{aug}+G_i), \text{ if } H_i x_{aug} \le K_k \quad (11)$$

The method further includes applying partial inversion to the rate-based predictive model controller outputs to convert an EGR flow control signal to convert the VGT duty cycle signal to a VGT lift control signal.

The method further includes developing an EGR throttle controller according to:

$$\theta_{thr} = \begin{cases} \theta^{req} & \text{if } W_{egr}^{max} - W_{egr}^{req} > M_{egr} \\ \theta^{req} + C_{PID}(s)(M_{egr} - W_{egr}^{max} + W_{egr}^{req}) \end{cases} \quad (13)$$

The method further includes reducing the number of regions in each of the at least one zone by using a single time instant to enforce overshoot restraint of at least one controller output.

The method includes estimating the engine state, determining the region of the piecewise affine control law on the estimated engine state, applying feedback gain associated with the selected region of the piecewise affine control law to determine the control rate, and integrating the control rate to determine a control value to be applied to one engine input.

In another aspect, the method has the controller executing a computer program tangibly embodied on a computer usable medium comprising instructions that when executed by a processor is functional to use a rate based predictive model controller responsive to intake manifold pressure and EGR valve flow rate to control turbine lift and requested EGR flow rate.

BRIEF DESCRIPTION OF THE DRAWING

The various features, advantages and other uses of the present engine control method will become more apparent by referring to the following detailed description and drawing in which.

DETAILED DESCRIPTION

Figure 1:
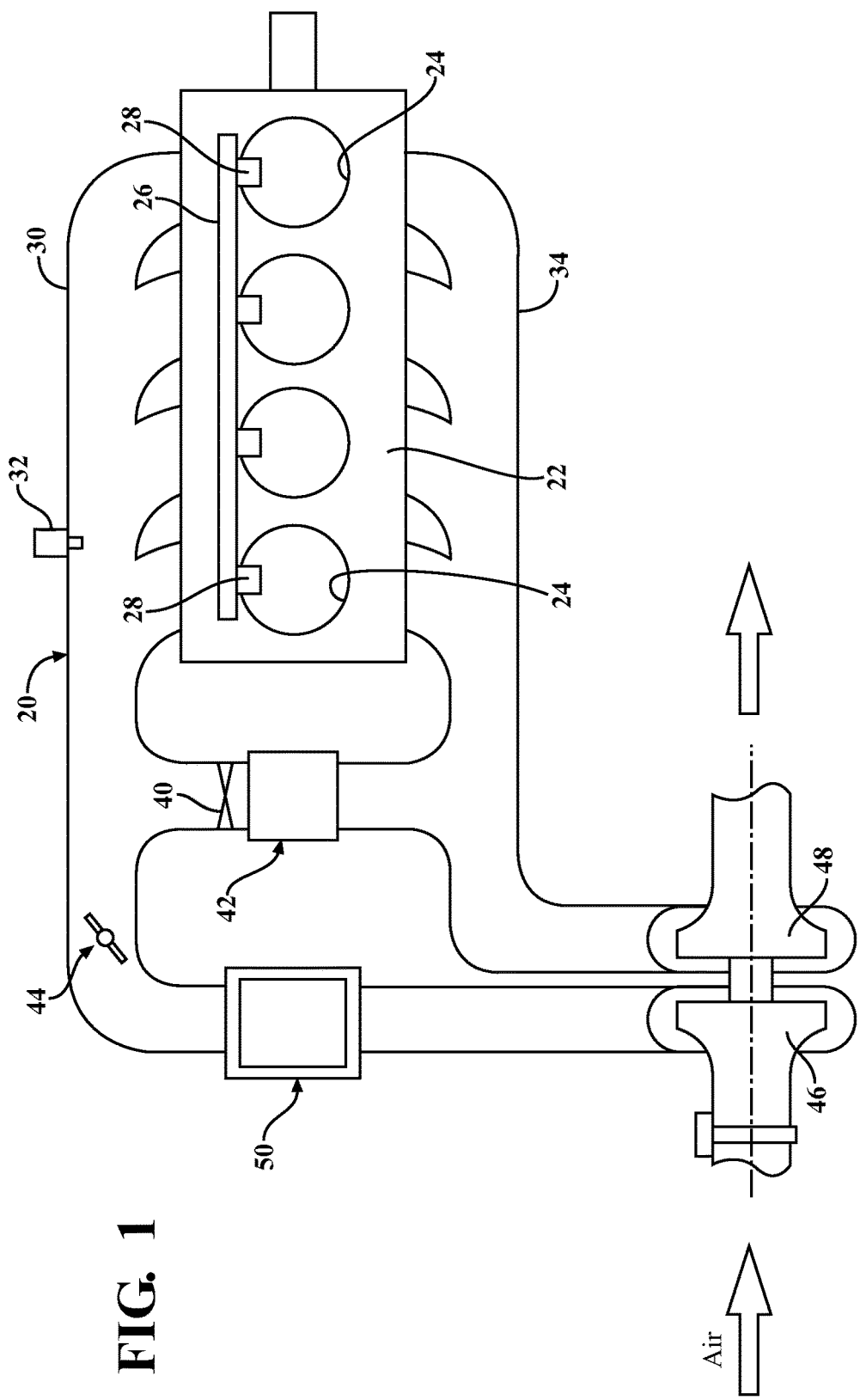
FIG. 1 is a pictorial representation of a diesel engine using a rate based predictive model controller.

Referring now to FIG. 1, an internal combustion engine 20, described hereafter by example as a diesel engine, includes an engine block 22 housing a plurality of cylinders 24. A fuel rail 26 connected to a fuel supply, not shown, supplies diesel fuel to a plurality of fuel injectors 28 with one fuel injector provided for each cylinder 24.

An intake manifold 30 is coupled to the cylinders 24 for supplying intake air to each cylinder. An intake manifold pressure sensor 32 is coupled to the intake manifold 30 for measuring intake manifold air pressure.

An exhaust manifold 34 carries combustion gases from the cylinders 24 away from the engine block 22.

An EGR valve 40 is coupled in a bypass path between the intake manifold 30 and the exhaust manifold 34 to recirculate a portion of the exhaust gases from the exhaust manifold 34 back into the intake manifold 32 for supply to the cylinders 24. An EGR cooler 42 may be coupled in the bypass path along with the EGR valve 40.

An EGR throttle 44 is mounted in the airflow path from the compressor 46 of the variable geometry turbine (VGT) 48 to control gas circulation.

An intercooler 50 may be mounted in the intake air path ahead of the EGR throttle 44.

The variable geometry turbine 48, by controlling the angle of the turbine input vanes, controls the intake manifold pressure via the compressor 46.

Figure 2:
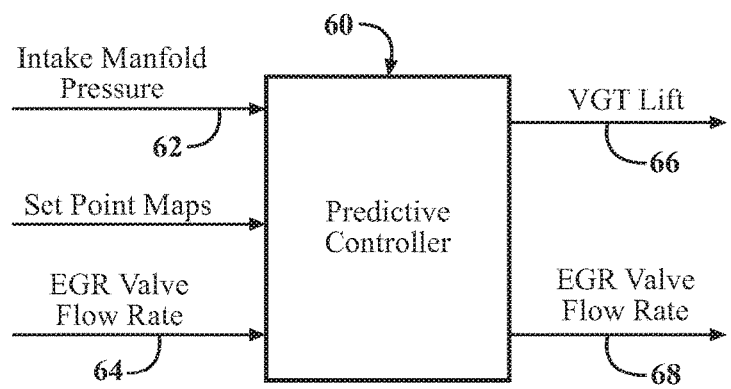
FIG. 2 is a block diagram showing the inputs and outputs to the rate based predictive model controller.

According to the present method, a rate based predictive model control (RB-MPC) for the engine 20 uses a plurality of control inputs, such as intake manifold pressure 62 and EGR valve flow rate 64 as shown in FIG. 2. Partial nonlinear inversion, as described hereafter, is used to backtrack the two inputs 62 and 64 to VGT lift duty cycle and EGR valve position, respectively. Partial inversion reduces the degree of model nonlinearity, and is a first step toward reducing the number of zones to cover engine operating range and hence computational complexity.

Partial inversion also avoids the need to deal with DC gain reversal. The controller 60 design uses partitioning of the engine operating range, composed of engine speed and fuel rate, for reduced order linearized engine models within each zone of operation. Only a single zone may be used for good tracking performance under control and state constraints. Thus, the ROM usage in the ECU can be reduced, as well as controller calibration time. A separate controller can be employed for use of the EGR throttle.

Figure 3:
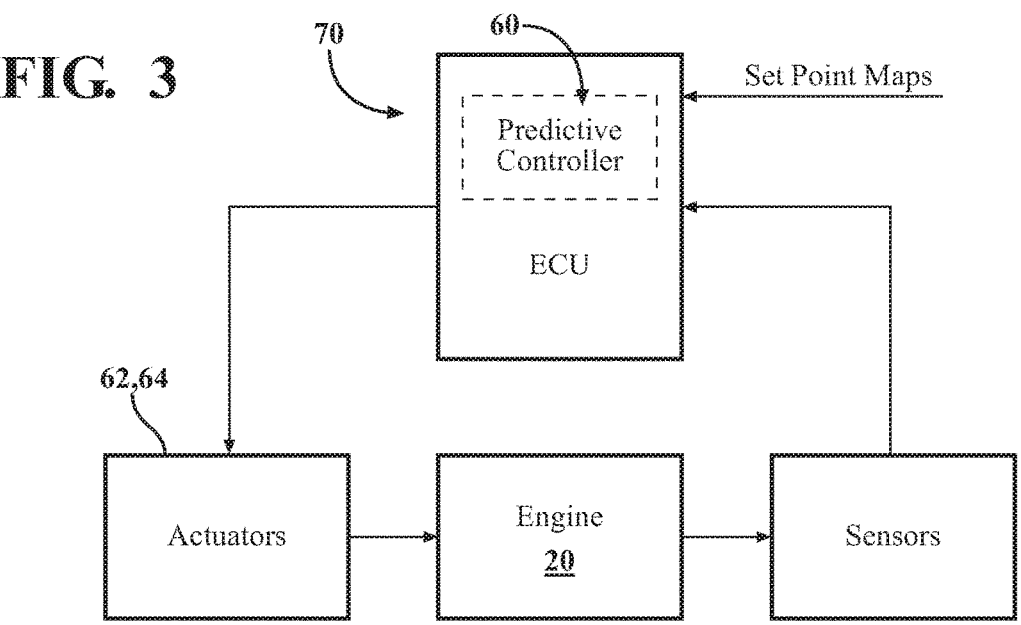
FIG. 3 is a schematic block diagram of an engine using the rate based predictive model controller of FIG. 2.

An explicit MPC solution can be computed and is used in the ECU 70, FIG. 3, rather than one based on on-board quadratic programming. This implementation is motivated by limited computing power and code simplicity.

The rate based predictive model includes the following elements:

Set-point map that prescribes set-points for intake pressure and EGR rate.

Prediction model based on reduced order linearizations of the diesel engine model;

Explicit Model Predictive Controller that generates requested VGT lift and requested EGR flow while enforcing time-varying constraints on intake pressure and maximum EGR flow.

Partial Inversion block that computes VGT duty cycle (percent closed) and EGR valve position (percent open);

Kalman filter estimates based on measurements of intake pressure, ECU estimated EGR rate, and mass air-flow (MAF);

EGR throttle (% closed) controller that closes the throttle based on the margin between requested EGR flow and maximum EGR flow;

Markov Chain based MPC region selection process that searched is likelihood order for the appropriate region of the explicit Model Predictive Controller.

Figure 4:
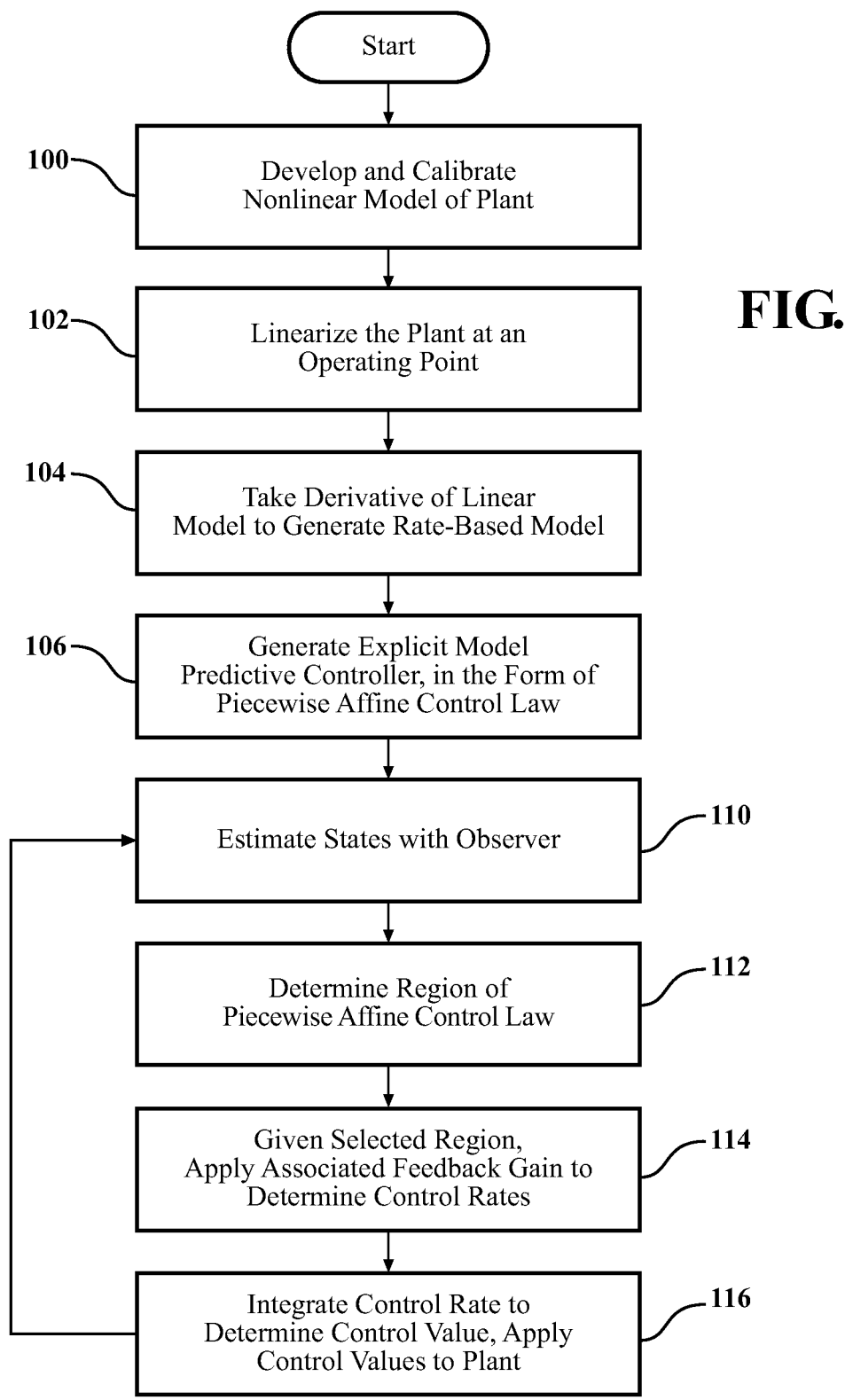
FIG. 4 is a flow diagram depicting the sequence steps and operating the rate based predictive model control method.

The nonlinear model for the engine 20 can be developed in step 100, FIG. 4, using a mean value, gray-box modeling approach that utilized physics and data fits. The main dynamic states in the model are the intake manifold pressure, exhaust manifold pressure, pre-throttle pressure, turbocharger turbine speed, EGR cooler outlet temperature, intake manifold density, exhaust manifold density, intake manifold burn gas fraction, exhaust manifold burnt gas fraction, and engine temperature. The inputs to the model are engine speed, fuel rate, VGT duty cycle, and EGR throttle position.

To render the model more linear, the control inputs are chosen to be intake manifold pressure 62 and EGR valve flow rate 64 instead of VGT duty cycle and EGR valve position. The control strategy utilizes partial nonlinear inversion to recover VGT duty cycle and EGR valve position from the prescribed control inputs 62 and 64. The remaining inputs, namely, engine speed, fuel rate and EGR throttle position, remain unchanged. The outputs are chosen as VGT lift and EGR valve flow rate, and MAF, not shown. MAF is only used as an input to the Kalman filter.

The engine operating range (fuel rate and engine speed range) is divided into zones centered at selected operating points. At each operating point, the nonlinear model is linearized resulting in a $10^{th}$ order linear model. Balanced truncation is applied to reduce the model order. Based on the analysis of Hankel singular values and preliminary design, it was determined that the order of the linear model can be reduced by two. Since the states of the reduced order model are transformative of physical states, a state observer is used to estimate them from measured outputs. Lowering the order of the linear design and model is advantageous as the controller ROM size is reduced and the state observer is lower dimensional.

To formulate the rate based predictive model, step 102, a $2^{nd}$ order continuous time linear model is used. A rate-based model, step 104, is then generated as a derivative of the linear model, as follows, $$\xi = [\dot{x}, y]^T \quad (2)$$

$$\dot{\xi} = \overline{A}\xi + \overline{B}_1 \dot{u} + \overline{B}_2 \dot{d}, y = \overline{C}\xi \quad (3)$$

-continued $$\bar{A} = \begin{bmatrix} A & 0 \\ C & 0 \end{bmatrix}, \bar{B}_1 = \begin{bmatrix} B_1 \\ D_1 \end{bmatrix}, \bar{B}_2 = \begin{bmatrix} B_2 \\ D_2 \end{bmatrix}, \bar{C} = [0 \ I] \quad (4)$$

where $\xi$ is an augmented state composed of the state derivative of the two reduced order states, $\dot{x}$ ^, and the outputs, y, intake pressure and EGR rate. The u is the vector of outputs (VGT lift, EGR valve flow), and d is the vector of measured disturbances, (EGR throttle position, engine speed, and fuel rate). The continuous time system realization corresponding A, $B_1$, $B_2$, C is then converted to discrete-time with a $T_s = 32_{m\ sec}$ sampling period to generate $A_d$, $B_{1d}$, $B_{2d}$, $C_d$ respectively, The rate based prediction model (RB-MPC) has the following form, $$\begin{bmatrix} \xi_{k+1} \\ u_{k+1} \\ \dot{d}_{k+1} \\ o_{k+1} \\ r_{k+1} \end{bmatrix} = \begin{bmatrix} \bar{A}_d & 0 & \bar{B}_{2d} & 0 & 0 \\ 0 & I & 0 & 0 & 0 \\ 0 & 0 & \lambda & 0 & 0 \\ 0 & 0 & 0 & I & 0 \\ 0 & 0 & 0 & 0 & I \end{bmatrix} \begin{bmatrix} \xi_k \\ u_k \\ d_k \\ o_k \\ r_k \end{bmatrix} + \begin{bmatrix} \bar{B}_{1d} \\ T_s \\ 0 \\ 0 \\ 0 \end{bmatrix} \dot{u}_k \quad (5)$$

The model will optimize the control rates $\dot{u}_k$. The states $u_k$ are current values of the controls. The $d_k$, the derivative of the measured disturbances, is augmented instead $0 \leq \lambda \leq 1$ is a prediction decay rate on the disturbance derivative and is chosen based on simulations. $o_k$ and $r_k$.

The incremental cost weights tracking error, control effort, and slack variables. The resulting optimization problem, assuming k=1 is the current time instant, has the following form.

$$\text{minimize } (\xi_N - \xi_d)^T P(\xi_N - \xi_d) + \Sigma_{i=1}^N (y_i - r_i)^T Q(y_i - r_i) + \dot{u}_i^T R \dot{u}_i + M \in^2 \quad (6)$$

subject to control restraints $$u_{min} \leq u_k \leq u_{max}, \forall k=1 \ldots N) \quad (7)$$

using a control horizon of $1:_s$ $$\dot{u}_k = 0 \text{ for } k \geq 2,) \quad (8)$$

and subject to a soft intake pressure overshoot constraint enforced intermittently at $n \in I \subset \{1, 2, \ldots, N_c\}$ $$y_{MAP\ n} - r_n 23\ o_{overshoot,n} + \in) \quad (9)$$

$\in \geq 0$)

where $\xi_d = [0 r_N]^T$ is the desired steady state value. The terminal cost. $(\xi_N - \xi_d)^T P(\xi_N - \xi_d)$ uses the P matrix corresponding to the solution of the Algebraic Riccati Equation of the associated uncontrained LQ problem.

To reduce the number of regions in the explicit controller, the control horizon was chosen as a single step. Using MPC guidelines for selecting the prediction horizon, and after tuning the controller in simulation, the output constraint horizon was set as $N_C = 30$ steps and the prediction horizon as N=50 steps.

The explicit MPC rate based controller 60 is generated in step 106 in the form of a piecewise affine control law using a MPT toolbox for Matlab. The controller 60 has a piecewise affine control law form.

$$u_{k+1} = u_k + T_s (F_i x_{aug} + G_i), \text{ if } H_i x_{aug} \leq K_k) \quad (11)$$

where $i \in \{1, \ldots, n_r\}$ denotes the ith polyhedral region, $(F_{i\ aug+}{}^X G_i)$ gives the requested control rates, $\dot{u}$, and, $$x_{aug} = \begin{bmatrix} \hat{\xi}_k \\ u_k \\ \dot{d}_k \\ o_k \\ r_k \end{bmatrix} \quad (12)$$

where $\hat{\xi}_k$ is the estimated plant model state. The total augmented state, $X_{aug}$, in (12) is of dimension 16.

Figure 5:
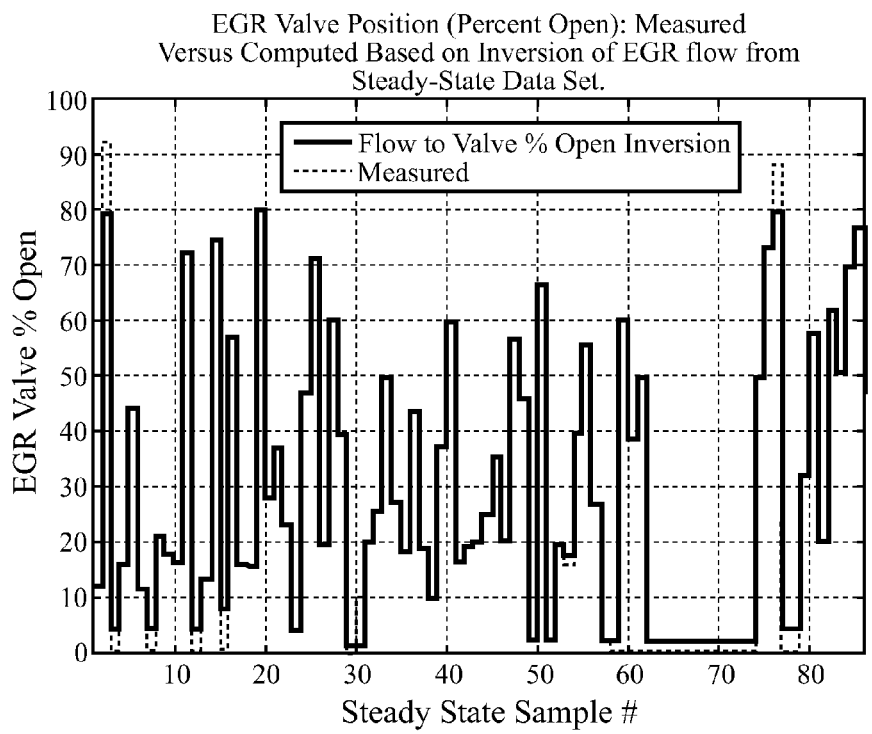
FIG. 5 is a graph depicting EGR valve position verses sample number.

Partial inversion is applied in the rate based predictive model controller 60 to replace EGR valve position control signal by EGR flow control signal and to replace VGT duty cycle signal by VGT lift control signal. The EGR valve flow is a function of intake pressure, exhaust pressure, exhaust temperature, EGR valve position, and engine speed. The inversion of EGR flow to EGR valve position is described in Huang et al. [2013]. Because EGR valve flow available as an ECU estimate, a PID controller can also be applied to the difference between EGR flow estimate and the requested EGR flow. FIG. 5 suggests that even without the PID controller, the inversion is sufficiently accurate. The discrepancies are compensated by the PID feedback and the by the outer loop MPC feedback.

Figure 6:
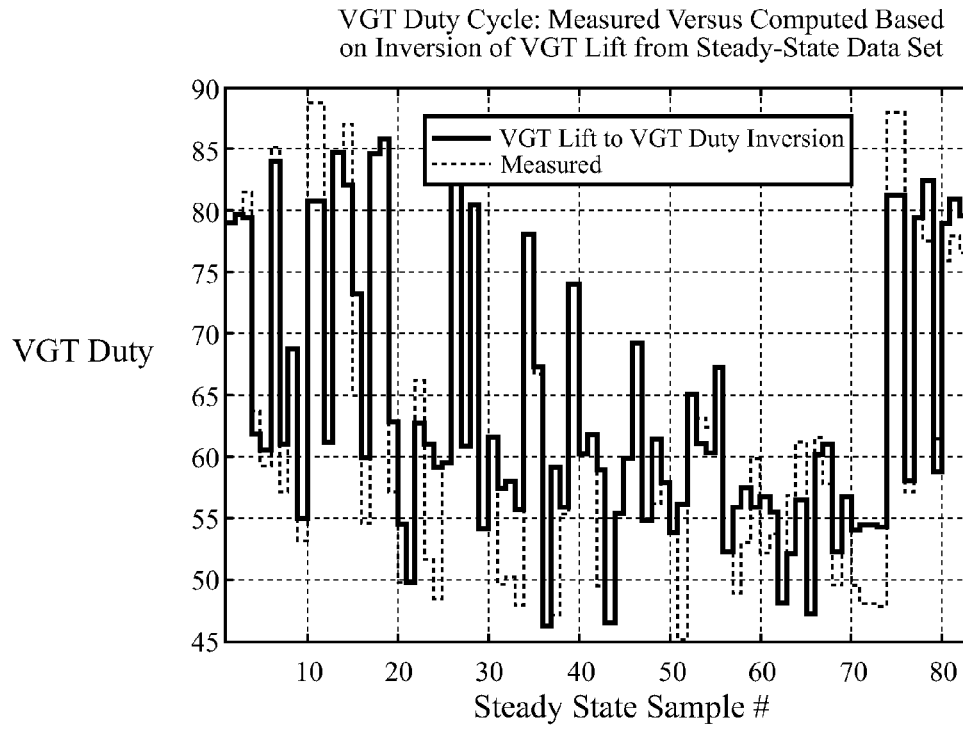
FIG. 6 is a graph depicting VGT duty cycle.

The partial inversion (but without dynamic compensation since VGT lift is not measured) is also used to convert VGT life requested by the MPC controller to a commanded VGT duty cycle. The pneumatic VGT actuator dynamics are complicated and involve hysteresis. Nevertheless, the model translates VGT lift, engine speed, exhaust pressure and exhaust temperature (that are available as ECU estimates) into VGT duty cycle, see FIG. 6.

The throttle controller is separate from the RB-MPC controller 60 and has the following form $$\theta_{thr} = \begin{cases} \theta^{req} & \text{if } W_{egr}^{max} - W_{egr}^{req} > M_{egr} \\ \theta^{req} + C_{PID}(s)(M_{egr} - W_{egr}^{max} + W_{egr}^{req}) \\ \text{otherwise} \end{cases} \quad (13)$$

The throttle controller sets the throttle position to the engine speed and fuel-dependent set-point, $\Theta^{req}$, prescribed by the throttle position feed-forward map, provided a margin, $M_{egr}$, is maintained between the requested EGR flow. $W_{egr}^{req}$. If this margin is eroded, a PID controller, $C_{PID(8)}$, is applied to recover the margin by closing the EGR throttle.

Several strategies can be used to reduce computational complexity. Intermittent constraint enforcement is used to reduce the number of generated regions. Rarely visited regions are then removed. A Markov Chain region selection process is also used to reduce the average time required to identify the active region. Table 1 compares the worst-case computational complexity RB-MPC with enforcement of either 6 or 1 incremental intake pressure overshoot constraints, $n_r$ is the number of regions per zone.

TABLE 1

| | $n_z$ | $\Sigma n_r$ | [kB] | flops | [μs] |
|---|---|---|---|---|---|
| RB-MPC $_w/6$ i.c. | 1 | 28 | 141.3 | 6551 | 406.2 |
| RB-MPC $_w/1$ i.c. | 1 | 10 | 35.0 | 1615 | 100.0 |

Due to extensive simulations over typical drive cycles, rarely visited regions can be removed to reduce computational complexity. In addition, small regions, i.e., regions that have a small Chebyshey radius, can be removed. With region elimination, the selected region is given by $$i \in \arg\min_i\{\max_j\{H_{ij}x_{aug}-K_{ij}\}\}) \quad (14)$$

where j corresponds to jth inequality in the definition of the ith region to which $x_{aug}$ strictly belongs is found. For strategies that use intermittent constraint enforcement, around half of the region have been additional removed.

The number of regions depends on the number of possible combinations of active constraints. Hence, to reduce the number of regions, the approach of enforcing the constraints at all-time instants over the prediction horizon is modified by enforcing tightened constraints at a smaller number of time instants. The final design of RB-MPC 60 uses just a single time instant (20 steps ahead) to enforce the intake pressure overshoot constraint.

Figure 7:
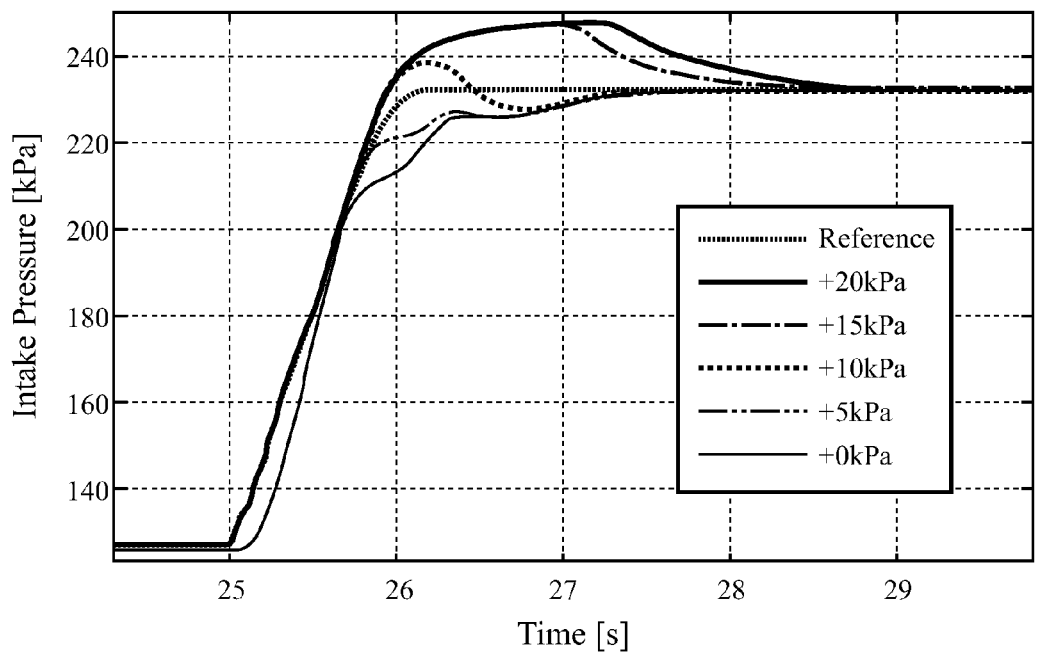
FIG. 7 is a graph depicting overshoot constraint enforcement.

FIG. 7 demonstrates this approach with RB-MPC controller 60. In this case, this approach is able to handle the overshoot constraint during a large step in fueling rate from 5 to 55 mm³/stroke which corresponds to a 124 kPa to 232 kPa step in the intake pressure set-point. The transient behavior highlights the benefits of using a rate-based approach.

Figure 9:
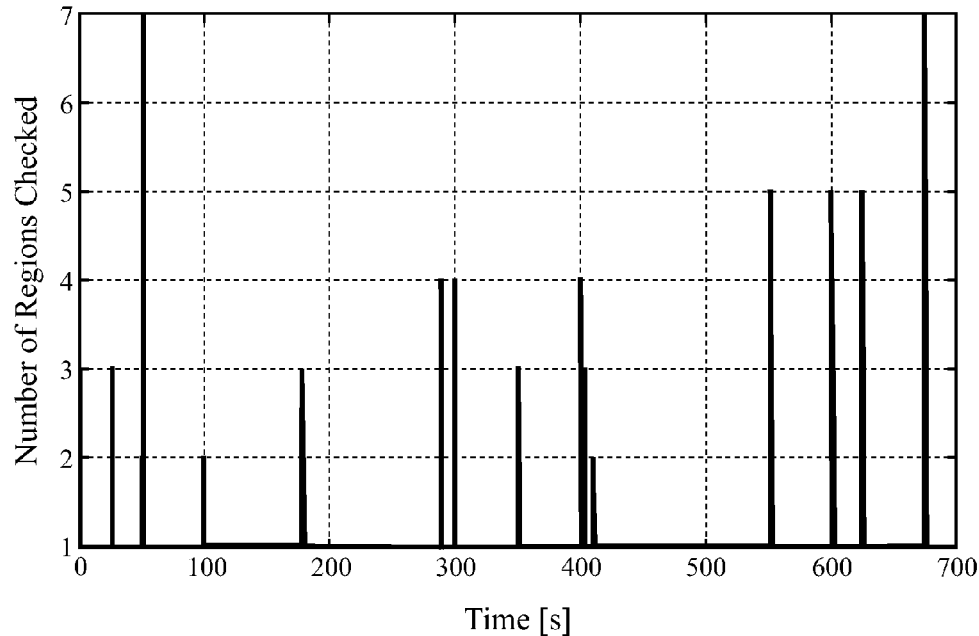
FIG. 9 a graph depicting number of regions sampled over time.
Figure 10:
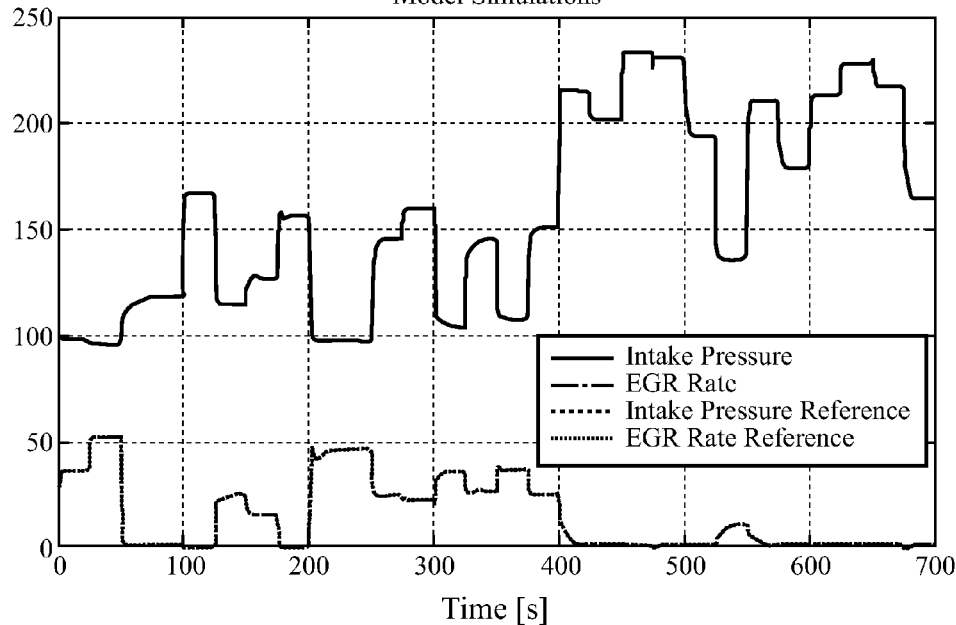
FIG. 10 is a graph depicting time histories of intake pressure and EGR rate.
Figure 11:
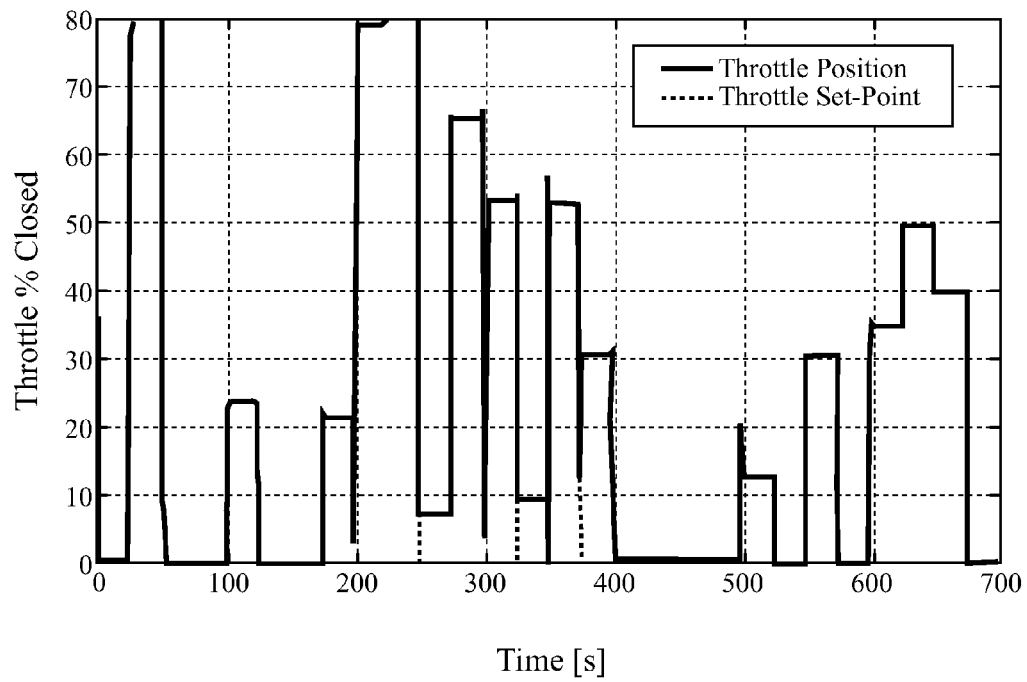
FIG. 11 is a graph depicting time histories of EGR throttle position.
Figure 12:
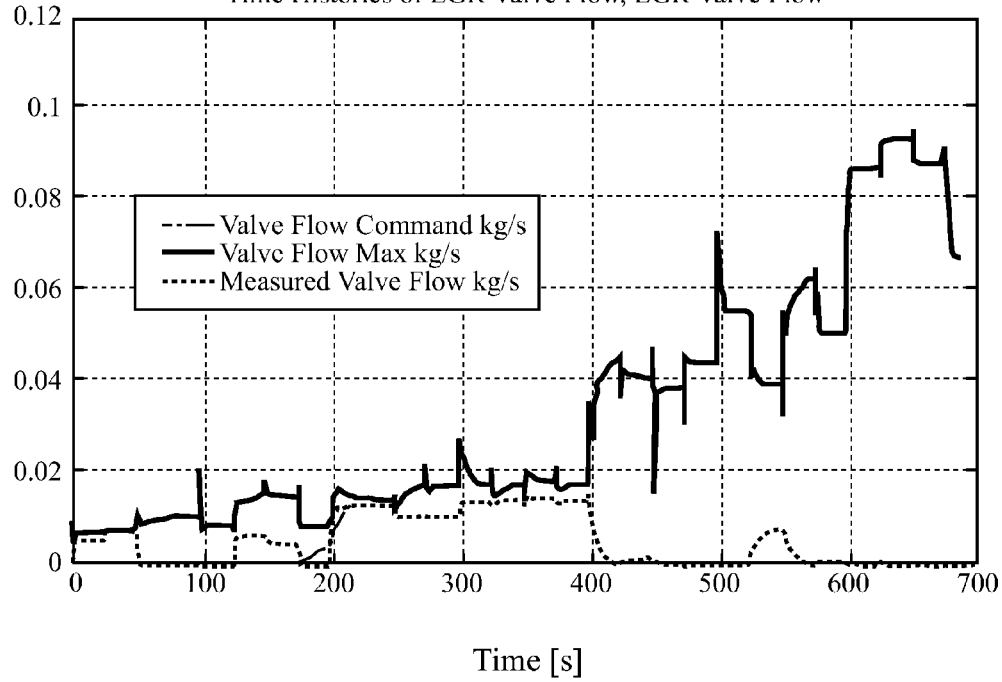
FIG. 12 is a graph depicting time histories of EGR valve flow and EGR valve flow commanded.
Figure 13:
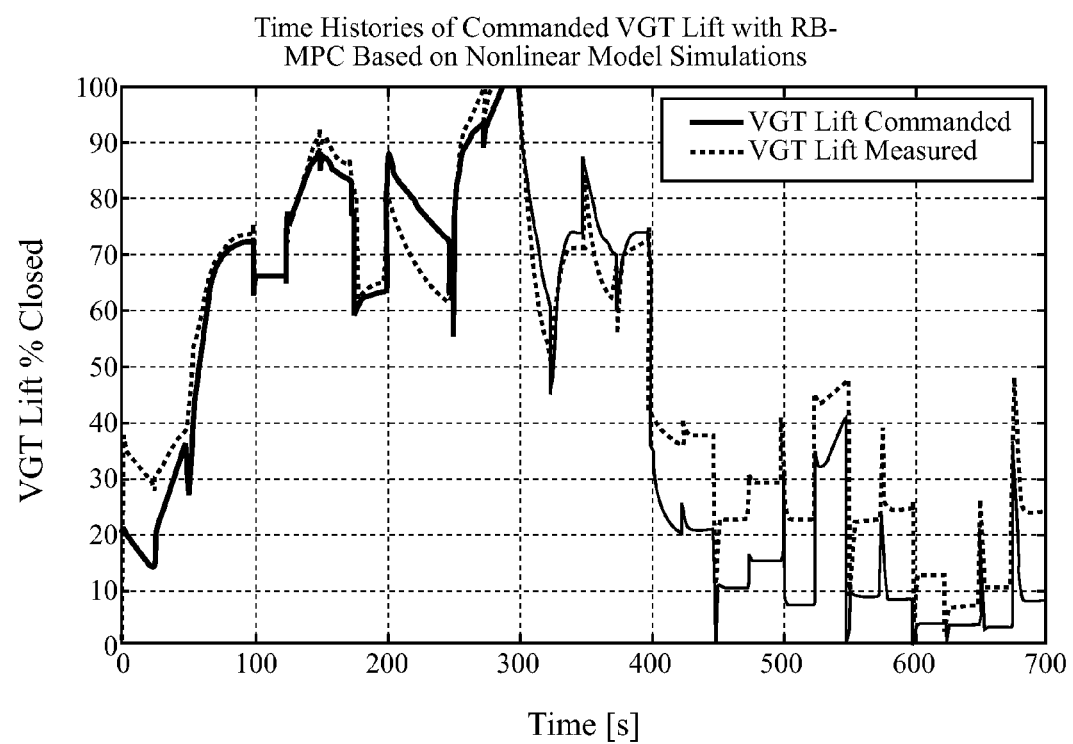
FIG. 13 is a graph depicting time histories of commanded VGT lift.

The performance benefit of RB-MPC is further exemplified in FIG. 9 which show the predicted trajectories for RB-MPC over a horizon N=50 steps.

In FIG. 9 the predicted trajectories for RB-MPC lie close to the true trajectory even though the linearization point at 1750 rpm is further from the stimulated operating condition, 3500 rpm, than a linearization point 3250 rpm.

Figure 8:
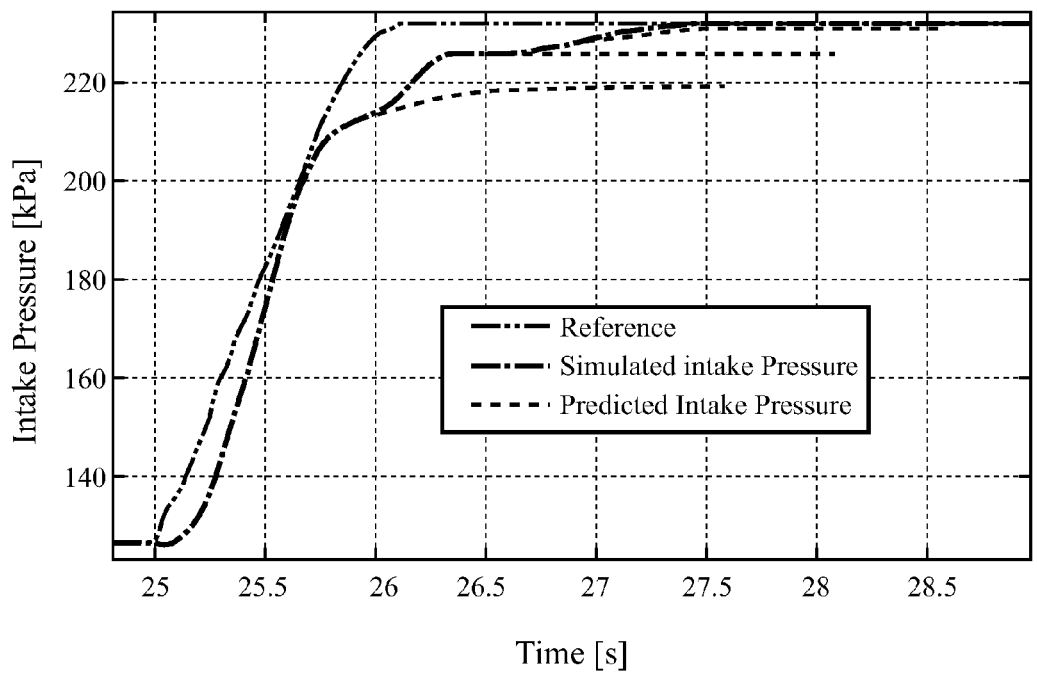
FIG. 8 is a graph depicting projected trajectories of intake pressure over time.

When using the RB-MPC controller 60, the computation cost is dominated by checking the inequality for each region. The Markov Chain process is intended to speed up the average case region selection process by searching for the region $x_{aug}$ is currently inside in likelihood order. From drive cycle stimulations and the trajectory of regions visited, a transition probability matrix for an associated Markov Chain model of region transitions is created. Each entry represents the probability of transitioning from the previous region, indexed by column. The probability transition matrix is then sorted to produce, for each previous region, the order in which to check for the current region. FIG. 8 shows the number of regions checked during this simulation. In the worst case, the computation time is the same as the one shown in Table 1. This corresponds to 10 regions checked if $x_{aug}$ is indeed in the $10^{th}$ region, or if $x_{aug}$ is inside one of the removed regions. For the majority of the simulation, only a single region is checked. This is to be expected because generally $x_{aug}$ will stay in the same region as it was during the previous time step.

The simulation results of RB-MPC controller 60 on the nonlinear model of the engine 20 as shown in FIGS. 10-13. These figures show fuel step responses covering engine speed ranges from 1000 to 4000 rpm and fuel rates between 5 and 55 mm³ stroke. Every 100 sec is a step up of engine speed by 500 rpm. A single RB-MPC controller 60 is used and the linearization point is located at 1750 rpm, 45 mm3/stroke. The controller demonstrates good tracking performances and overshoots constraint handling through the entire operating range. As apparent from FIG. 11, the EGR throttle occasionally closes, e.g. at 25 sec, more than dictated by EGR throttle set-point to recover EGR flow margin.

Referring back to FIG. 4, once the rate base predictive model controller 60 is generated in step 106, the controller 60 is implemented in the ECU 70 of the engine 20 as shown in FIG. 3.

The ECU 70 has a processor that executes a computer program tangibly embodied on computer useable medium and comprising instructions that when executed by the processor implement the rate based predictive model controller described above.

The ECU 70 may include a central processing unit which may any type of device, or multiple devices, capable of manipulating or processing information. The central processing unit is practiced with a single processor or multiple processors.

The central processing unit accesses a memory, which can be a random access memory or any other suitable type of storage device. The memory can include code and data that is accessed by the central processing unit. The memory can further include an operating system and application programs, including the rate based predictive model controller used to performed the method described herein.

The ECU 70 using the rate based predictive model controller 60 will estimate the engine state space that is divided into regions by means of an algorithm or formulas. Once the state is determined in state 110, the ECU 70, via the rate based predictive model controller 60, determines, by using the estimated state in step 108, the region of a piecewise affine control law generated in step 112.

Once a region is determined in step 112, the ECU 70, via the rate based predictive model controller 60, in step 114, applies a feedback gain, stored in memory, which is associated with the selected region to determine the control rates of the actuator 62, 64. Finally, the ECU 70, via the rate based predictive model controller 60, in step 116, integrates the determined control rate from step 114 to determine a control value for the actuator 62 or 64, which is then applied by the ECU 60 to the actuator the outputs 62, 64.

What is claimed is:

1. A method for controlling an internal combustion engine having a controller controlling a variable geometry turbine and an EGR valve during engine operation, the method comprising:
    developing a non-linear model using engine operating parameters;
    developing a linear quadratic model predictive controller, based on the non-linear model, for each engine operating zone;
    generating a rate based predictive model based on the linear quadratic model, and using the rate based predictive model in the controller responsive to engine intake manifold pressure and EGR valve flow rate, to generate requested engine turbine lift and requested EGR flow rate; and
    controlling operation of the internal combustion engine based on the generated engine turbine lift and the generated EGR flow rate.

2. The method of claim 1 further comprising:
    defining at least one engine operating zone about a center linearization point for engine speed ranges and fuel rate ranges.

3. The method of claim 2 further comprising:
    linearizing the non-linear model at a center linearization point within an engine operating zone.

4. The method of claim 3 further comprising:
    developing a second order reduced linear model based on the non-linear model.

5. The method of claim 4 further comprising:
    generating the rate-based predictive model as a derivative of the linear model.

6. The method of claim 5 further comprising:
generating the linear model as a linear quadratic model in the form of a piecewise affine control law wherein:

$$u_{k+1}=u_k+T_s(F_i\tilde{x}_{aug}+G_i), \text{if} H_i\tilde{x}_{aug} \leq K_k.$$

7. A method for controlling an internal combustion engine having a controller controlling a variable geometry turbine and an EGR valve during engine operation, the method comprising:
using a rate-based predictive model in the controller responsive to engine intake manifold pressure and EGR valve flow rate, to generate requested engine turbine lift and requested EGR flow rate;
applying partial inversion to the rate-based predictive model controller to convert an EGR valve flow rate signal to an EGR valve position duty cycle signal and to convert a turbine lift signal to a turbine lift duty cycle signal; and
controlling operation of the internal combustion engine based on the converted EGR valve position duty cycle signal and the converted turbine lift duty cycle signal.

8. A method for controlling an internal combustion engine having a controller controlling a variable geometry turbine and an EGR valve during engine operation, the method comprising:
developing an EGR throttle controller according to:

$$\theta_{thr} = \begin{cases} \theta^{req} & \text{if } W_{egr}^{max} - W_{egr}^{req} > M_{egr} \\ \theta^{req} + C_{PID}(s)(M_{egr} - W_{egr}^{max} + W_{egr}^{req}) \end{cases}$$

in a rate-based predictive model in the controller responsive to engine intake manifold pressure and EGR valve flow rate, to generate requested engine turbine lift and requested EGR flow rate; and
controlling operation of the internal combustion engine based on the generated engine turbine lift and the generated EGR flow rate.

9. The method of claim 1 further comprising:
reducing the number of regions in each of the at least one engine operating zone by using a single time instant to enforce overshoot restraint of at least one controller output.

10. The method of claim 9 wherein:
the single time instant includes 20 time steps.

11. The method of claim 6 comprising:
estimating an engine state;
determining the region of the piecewise affine control law based on the estimated engine state;
applying feedback gain associated with the selected region of the piecewise affine control law to determine a control rate; and
integrating the control rate to determine a control value to be applied to one engine input.

12. A method for controlling an internal combustion engine having a controller, the method comprising:
controlling a variable geometry turbine and an EGR valve during engine operation by using a computer program tangibly embodied on a computer usable medium and comprising instructions that when executed by a processor is configured to:
use a rate-based predictive model, responsive to intake manifold pressure and requested EGR valve flow rate, to generate engine turbine lift and EGR flow rate; and
define at least one engine operating zone about a center linearization point for engine speed ranges and fuel rate ranges; and
control operation of the internal combustion engine based on the generated engine turbine lift and the generated EGR flow rate.

13. The method of claim 12, further comprising instructions for:
developing a non-linear model using operating parameters.

14. The method of claim 12, further comprising instructions for:
linearizing the non-linear model at a center linearization point within an engine operating zone.

15. The method of claim 14, further comprising instructions for:
generating the rate-based predictive model as a derivative of the non-linear model.

16. The method of claim 12, further comprising instructions for:
estimating an engine state;
determining the region of the piecewise affine control law based on the estimated engine state;
applying feedback gain associated with the selected region of the piecewise affine control law to determine a control rate; and
integrating the control rate to determine a control value to be applied to one engine input.

* * * * *

UNITED STATES PATENT AND TRADEMARK OFFICE
CERTIFICATE OF CORRECTION

PATENT NO.       : 9,581,080 B2
APPLICATION NO.  : 13/724957
DATED            : February 28, 2017
INVENTOR(S)      : Mike Huang et al.

Page 1 of 1

It is certified that error appears in the above-identified patent and that said Letters Patent is hereby corrected as shown below:

In the Specification

Column 5, Line 7: "$\dot{x}\,^{\wedge}$" should be "$\dot{x}^{\wedge}$"

Column 5, Line 30: "simulations. $o_k$" should be "simulations $o_k$"

Column 5, Line 48: "$y_{MAP\;n}$-$r_n 23 o_{overshoot,n}+\epsilon$" should be "$y_{MAP\;n}$-$r_n \leq o_{overshoot,n}+\epsilon$"

Column 5, Line 50: "$0 r_N$" should be "$o_{overshoot} r_N$"

Column 5, Line 66: "ith" should be "$i^{th}$"

Column 5, Line 67: "$F_{i\;aug+}{}^x G_i$" should be "$F_{i\;aug}{}^x + G_i$"

Column 7, Line 56: "$mm^3$ stroke" should be "$mm^3$/stroke"

Column 7, Line 59: "mm3/stroke" should be "$mm^3$/stroke"

Signed and Sealed this
Tenth Day of July, 2018

Andrei Iancu
*Director of the United States Patent and Trademark Office*